(12) United States Patent
Paul et al.

(10) Patent No.: US 6,505,713 B1
(45) Date of Patent: Jan. 14, 2003

(54) TIRE LOCATING WHEEL RESTRAINT

(75) Inventors: Lester W. Paul, Cedar Grove, WI (US); Arthur S. Ellis, Peterborough (CA)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 09/645,672

(22) Filed: Aug. 24, 2000

(51) Int. Cl.[7] .............................................. B61H 13/00
(52) U.S. Cl. .......................... 188/36; 294/904; 410/30; 410/61
(58) Field of Search ................................ 188/5, 31, 32, 188/36; 294/904, 81.1, 81.2, 81.4, 81.41; 410/9, 19, 30, 49, 52, 56, 57, 58, 62, 66, 69; 414/401, 396, 426, 429

(56) References Cited

U.S. PATENT DOCUMENTS

| | | | |
|---|---|---|---|
| 4,969,792 A | * 11/1990 | Ellis | 414/401 |
| 5,375,965 A | 12/1994 | Springer et al. | 414/786 |
| 5,582,498 A | * 12/1996 | Springer | 414/401 |
| 5,762,459 A | * 6/1998 | Springer | 414/401 |
| 6,199,668 B1 | * 3/2001 | Gorza | 188/5 |

FOREIGN PATENT DOCUMENTS

| | | |
|---|---|---|
| DE | 44 01 653 C | 10/1995 |
| EP | 0 537 075 A1 | 4/1993 |
| FR | 2652340 | 3/1991 |
| WO | WO 96/12665 | 5/1996 |

OTHER PUBLICATIONS

International Search Report from PCT/US01/26366.

\* cited by examiner

*Primary Examiner*—Jack Lavinder
*Assistant Examiner*—C. J. Bartz
(74) *Attorney, Agent, or Firm*—Marshall, Gerstein & Borun

(57) ABSTRACT

A tire locating wheel restraint for securing a parked vehicle against movement in one direction is provided. The wheel restraint includes a trigger for sensing the position of a tire of the vehicle, and collapsible locking assembly for engaging and restraining the tire. The trigger and collapsible locking assembly travel along a path within a base on which the vehicle is parked. Once the tire is sensed, the collapsible locking assembly is erected and moves longitudinally relative to the trigger until the tire is engaged and restrained. The relative movement between the trigger and the locking assembly enables the wheel restraint to secure tires of different sizes.

19 Claims, 15 Drawing Sheets

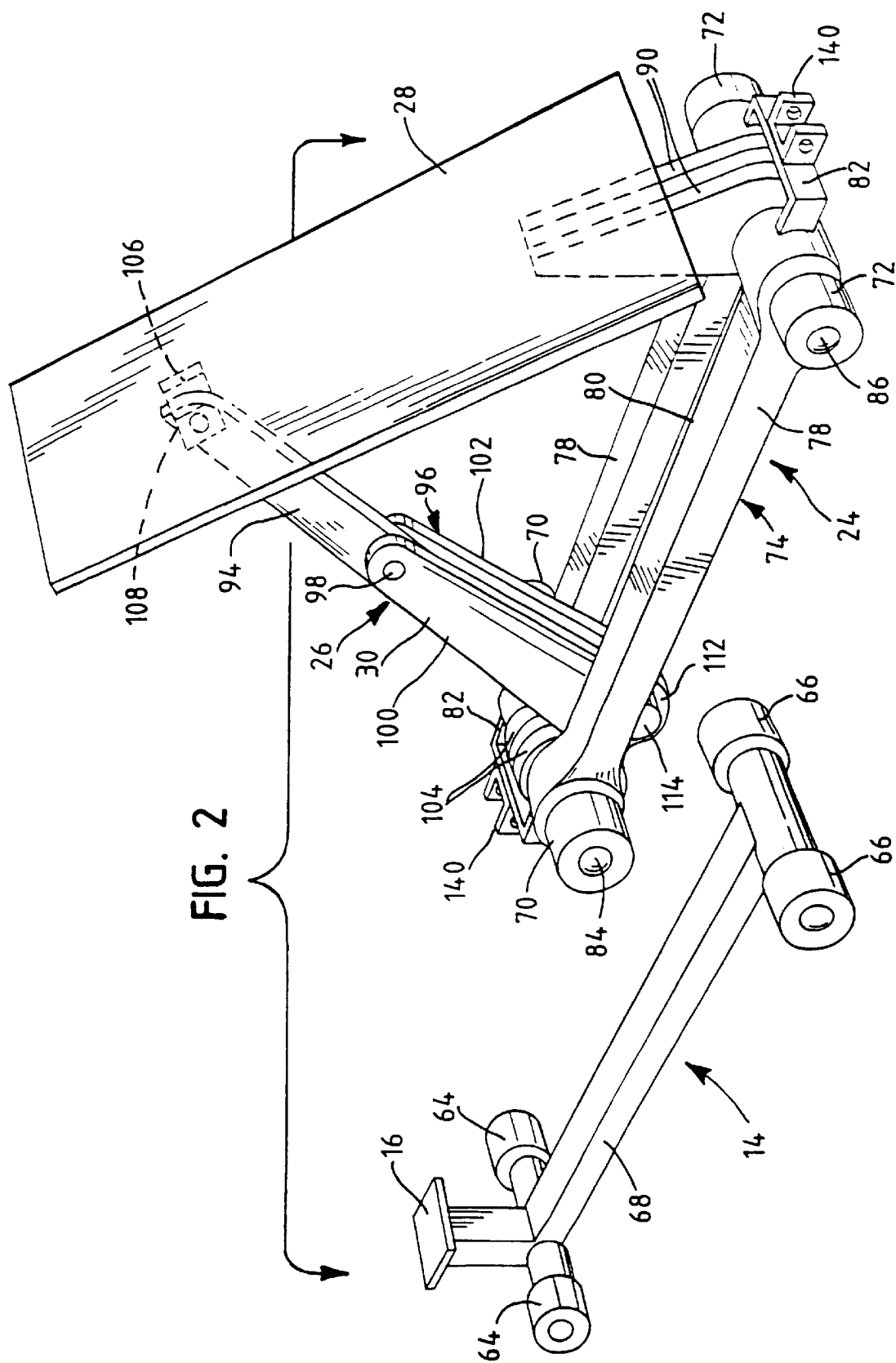

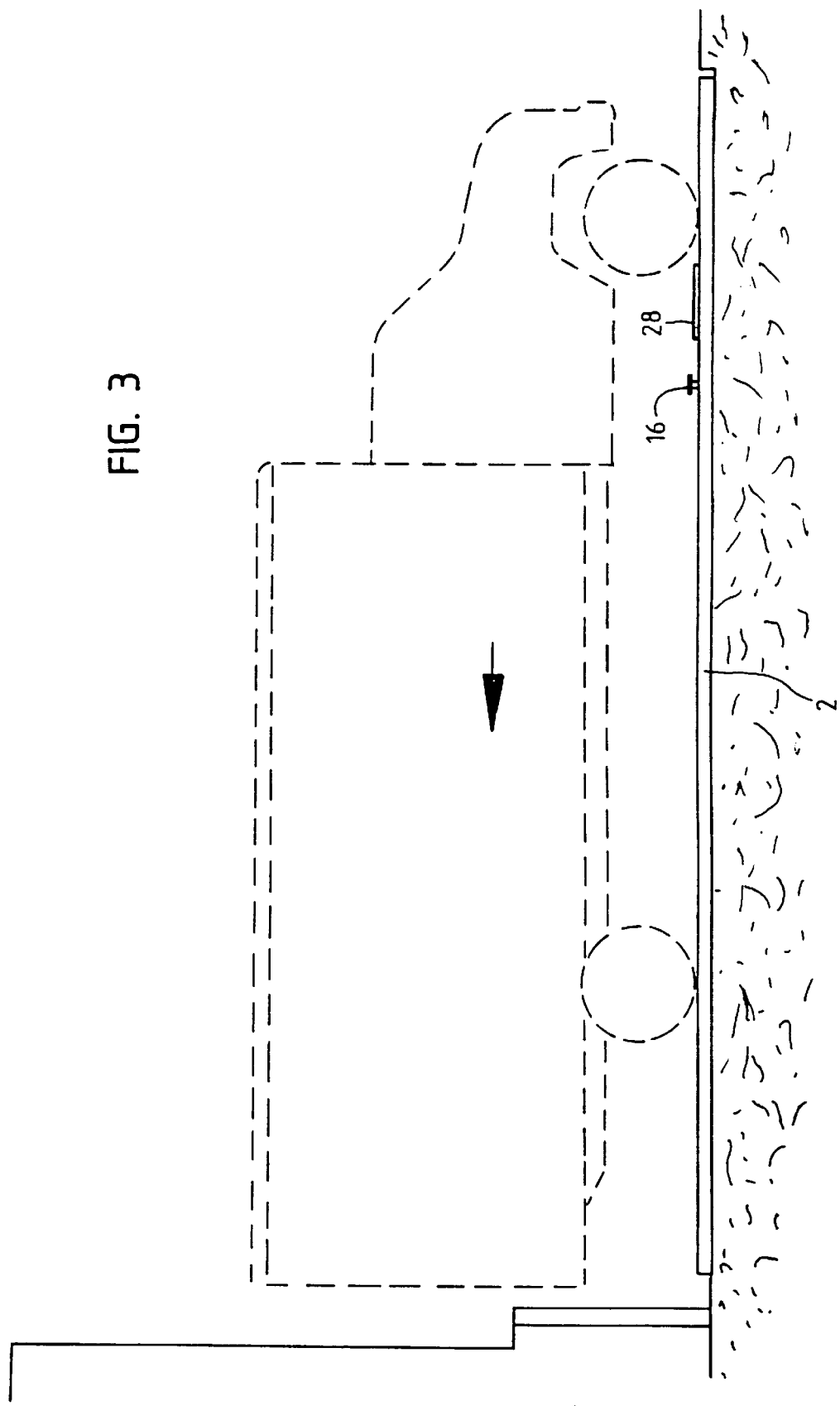

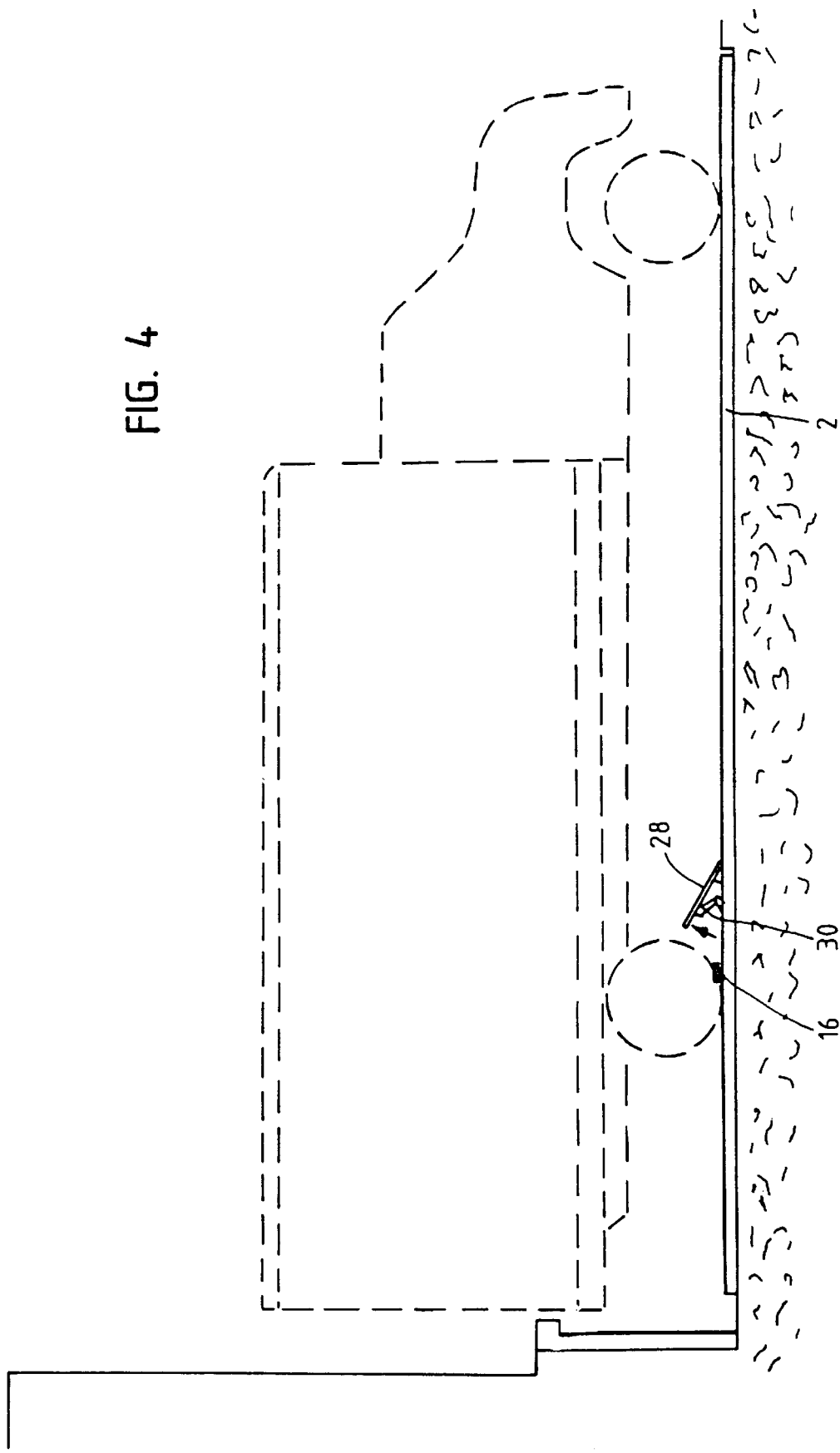

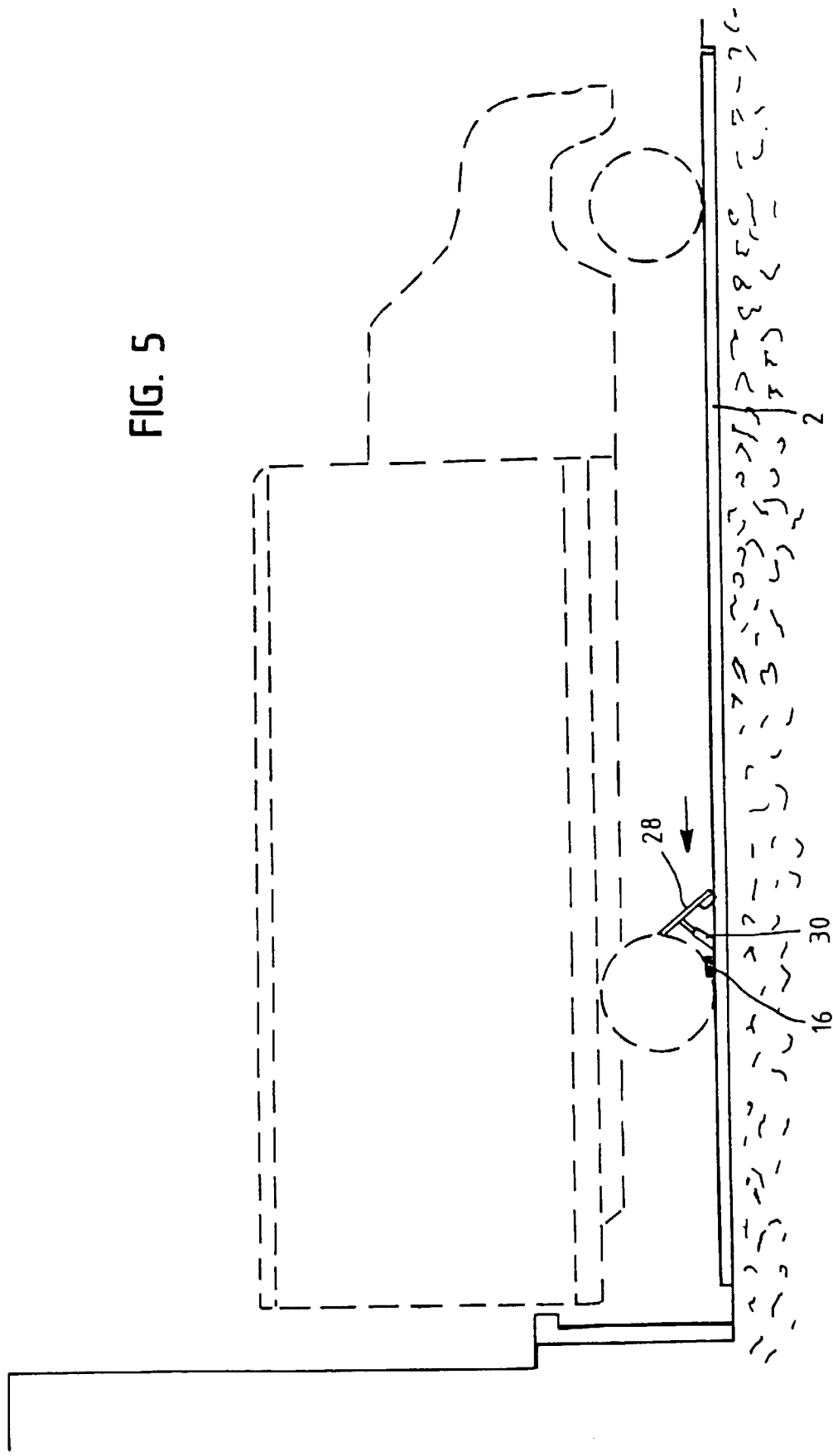

TIRE LOCATING WHEEL RESTRAINT

FIELD OF THE INVENTION

The present invention relates generally to vehicle restraints, and more particularly to a tire locating wheel restraint for securing a vehicle in a parking area.

BACKGROUND OF THE INVENTION

The need for mechanisms to restrain parked vehicles against movement has long been known. Vehicle restraint is important in numerous industries which use trucks and other vehicles for the delivery of goods. Without proper restraints during loading and unloading, trucks can inadvertently move forward or backward from a dock creating the potential for harm to human life and property. This problem is readily apparent on docks employing a dock leveler, a device commonly used to adapt a dock of a fixed height to trucks of varying size or trailer bed height. With docklevelers, it is desirable to maintain a certain lip purchase to prevent the leveler from falling off the loading bed of the truck. This can be done by stabilizing the position of the truck with a chocking mechanism. In fact, the Federal Occupational Safety and Health Administration (OSHA) requires that wheel chocks be used in conjunction with dock levelers. However, through a letter opinion, OSHA has stated that it will permit the use of vehicle restraints in lieu of wheel chocks.

Vehicle restraints which block or otherwise place a barrier in front of one or more wheels of a vehicle are known in the art. Some such known restraints require manual placement of the wheel block, often referred to as a chock, adjacent the tire of the vehicle to be restrained. Other more sophisticated, restraints automatically position a locking assembly adjacent a tire of the vehicle either by translation of a barrier to a position adjacent the tire, or by forming a barrier adjacent the tire. Although many manual vehicle restraints are highly effective, in some instances, automatic vehicle restraints provide better restraint of vehicles than do manual chocks.

Unfortunately, tire size varies from vehicle to vehicle. Since automatic wheel restraints are limited by their geometry and operation, a given restraint may not make proper contact with wheels of every possible size; may, thus, not be able to effectively restrain a full range of vehicles; and, may therefore not be suitable for certain applications. More specifically, the geometry of prior art automatic vehicle restraints has, in some instances, resulted in a small gap existing between the locking assembly and the tire even after the tire has been "chocked". Such a gap is disadvantageous because it affords the tire a running start at the locking assembly which could result in failure of the locking assembly (e.g., the tire jumping over the locking assembly or the locking assembly being collapsed or damaged).

The automotive industry provides particular challenges to vehicle restraints. In particular, the docks used at manufacturing facilities in the automotive industry are often higher than docks in other industries. Recently, trailers used to transport goods have become lower in the sense that the trailer beds reside closer to the ground. This combination of higher docks and lower trailer beds has resulted in the need for a means of compensating for this growing height differential-truck levelers. Truck levelers are mechanical devices that lift a trailer from the ground to achieve substantial leveling between a dock platform and the bed of the lifted trailer to facilitate loading and unloading of the trailer. Because the surface on which the truck is placed moves, chocking a vehicle on a truck leveler presents a new set of problems.

SUMMARY OF THE INVENTION

In accordance with an aspect of the invention, a tire locating wheel restraint is provided for use in restraining a vehicle having a tire in a parking area. The tire locating wheel restraint comprises a tire-locating mechanism in the form of a first trolley including a trigger that locates the tire of the vehicle. The first trolley is moveable between a first position wherein the trigger is displaced from the tire and a second position wherein the trigger contacts and thus locates the tire. The wheel restraint also comprises a tire-engaging mechanism in the form of a second trolley including a collapsible locking assembly having a distal portion for engaging the tire. The second trolley is moveable from a third position wherein the collapsible locking assembly is out of engagement with the tire to a fourth position wherein the distal portion of the collapsible locking assembly is in engagement with the tire. The first and second trolleys cooperate to erect the collapsible locking assembly adjacent the tire and then to move the erected locking assembly such that the distal portion of the collapsible locking assembly contacts the tire. The distance between the distal portion of the collapsible locking assembly and the trigger when the second trolley is in the fourth position and the first trolley is in the second position is dependent upon the size of the tire. That is, the first and second trolleys are moveable relative to each other. The wheel restraint is further provided with a drive mechanism for moving the first and second trolleys.

In accordance with another aspect of the invention, a tire locating wheel restraint is provided for use in restraining a vehicle having a tire in a parking area. The tire locating wheel restraint includes a first channel located in a first plane, and a second channel located in a second plane adjacent the first plane. The wheel restraint also includes a tire-locating mechanism in the form of a first trolley disposed for movement along the first channel. The first trolley includes a trigger positioned for sensing the tire of the vehicle. The wheel restraint is further provided with a tire-engaging mechanism in the form of a second trolley disposed for movement along the second channel and including a collapsible locking assembly having a distal portion for engaging the tire of the vehicle. The second trolley assembly includes a camming surface which cooperates with the first trolley to erect the collapsible locking assembly. The wheel restraint also includes a drive system for moving the first and second trolleys along the first and second channels, respectively.

In accordance with still another aspect of the invention, a method of restraining a vehicle having a tire in a parking area is provided. The method comprising the steps of moving a tire-locating mechanism in the form of a first trolley having a trigger relative to the vehicle until the trigger contacts the tire; moving a tire-engaging mechanism in the form of a second trolley having a collapsible locking assembly with a contacting surface relative to the first trolley to erect the collapsible locking assembly; and adjusting the distance between the trigger of the first trolley and the contacting surface of the collapsible locking assembly until the trigger and the contacting surface simultaneously abut the tire.

In accordance with still another aspect of the invention, a locking mechanism is provided for use with a sprocket having a plurality of teeth. The locking mechanism comprises first and second guide plates disposed in substantially parallel planes. The parallel planes are substantially perpendicular to a plane bisecting the sprocket into first and second halves. The locking mechanism also includes a brake plate disposed for sliding movement between the first and second guide plates. Additionally, the locking mechanism is provided with a tire-sensing mechanism in the form of a linear actuator coupled to the brake plate for reciprocating the brake plate between a first position wherein a distal edge of the brake plate is disposed between at least two teeth of the sprocket to thereby substantially lock the sprocket against rotation and a second position wherein the distal edge of the brake plate is separated from the sprocket to permit rotation thereof.

In accordance with still another aspect of the invention, a tire locating wheel restraint is provided for use in restraining a vehicle having a tire in a parking area. The tire locating wheel restraint comprises a tire-locating mechanism that locates the tire of the vehicle. The tire-locating mechanism is moveable between a first position, displaced from the tire and a second position, locating the tire. The wheel restraint also comprises a tire-engaging mechanism including a collapsible locking assembly having a distal portion for engaging the tire. The tire-engaging mechanism is moveable from a third position wherein the collapsible locking assembly is out of engagement with the tire to a fourth position wherein the distal portion of the collapsible locking assembly is in engagement with the tire. The tire-locating mechanism and tire-engaging mechanism cooperate to erect the collapsible locking assembly and then to move the erected locking assembly such that the distal portion of the collapsible locking assembly contacts the tire. The distance between the distal portion of the collapsible locking assembly and the tire-locating mechanism when the tire-engaging mechanism is in the fourth position and the tire-locating mechanism is in the second position is dependent upon the size of the tire. That is, the tire-locating mechanism and the tire-engaging mechanism are moveable relative to each other. The wheel restraint is further provided with a drive mechanism for moving the tire-locating mechanism and the tire-engaging mechanism.

Other features and advantages are inherent in the apparatus claimed and disclosed or will become apparent to those skilled in the art from the following detailed description and its accompanying drawings.

BRIEF DESCRIPTION OF THE DRAWINGS

FIG. 2 is an isometric view of the trigger trolley and the barrier trolley of the wheel restraint of FIG. 1.

FIG. 3 is a side view of the wheel restraint of FIG. 1 in a collapsed position.

FIG. 4 is a side view of the wheel restraint of FIG. 1 in a partially erect position.

FIG. 5 is a side view of the wheel restraint of FIG. 1 in an erect position and engaging the tire of a vehicle.

DESCRIPTION OF PREFERRED EMBODIMENTS

Figure 1:
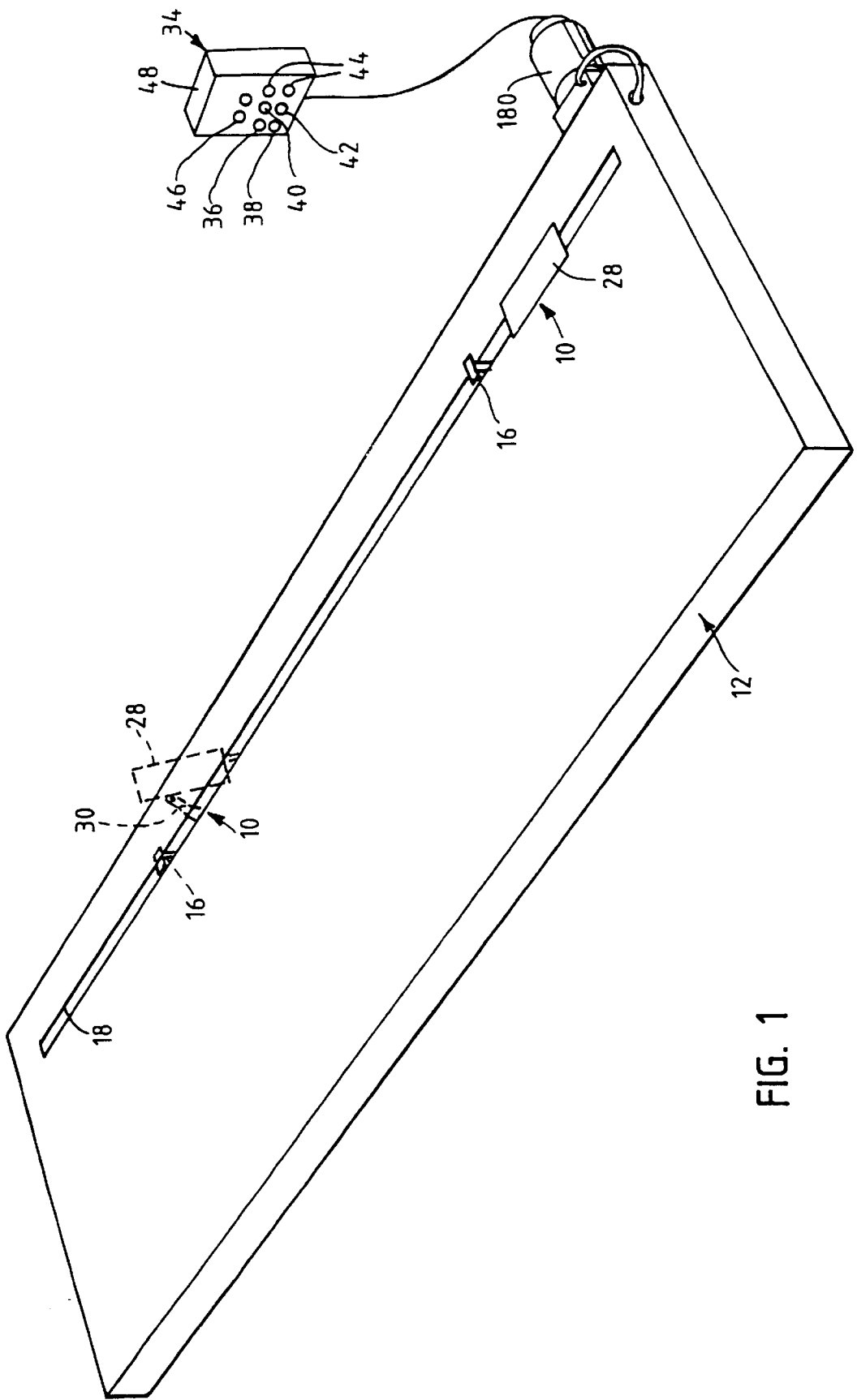
FIG. 1 is an isometric view of a tire locating wheel restraint constructed in accordance with the teachings of the invention which indicates the position of the wheel restraint in a collapsed position (in solid) and in an erect position (in phantom).

A tire locating wheel restraint 10 constructed in accordance with the teachings of the invention is shown in one possible environment of use in FIG. 1. The tire locating wheel restraint 10 is shown deployed in a base 12. As persons of ordinary skill in the art will appreciate, the teachings of the instant invention are not limited to any particular environment of use. On the contrary, the teachings of the invention can be employed in any environment which would benefit from the enhanced wheel restraining capabilities they achieve. By way of example, the base 12 can be a cement floor. By way of another example, the base 12 can be part of a truck leveler as discussed below.

The wheel restraint 10 is designed to locate a vehicle's tire and then restrain the wheel associated with the tire against movement. For the purpose of locating the tire, the wheel restraint 10 is provided with a tire-locating mechanism in the form of a trigger trolley 14 (see FIG. 2). The trigger trolley 14 includes a member such as a trigger 16 for sensing the tire. As shown in FIG. 1, the trigger trolley 14 is preferably disposed in substantial part beneath the base 12. The base 12 is provided with a longitudinal slot 18. The trigger 16 is disposed within the slot 18 and preferably extends a distance above the top surface of the base 12. As also shown in FIG. 1, the trigger trolley 14 is movable between a first trigger trolley position (for example, the right-most position in FIG. 1) and a second trigger trolley position (for example, the leftmost position in FIG. 1). When the trigger trolley 14 is in the first trigger trolley position, the trigger 16 is displaced from the tire to be restrained. When the trigger trolley 14 is in the second trigger trolley position, the trigger 16 is located in proximity to and preferably in contact with the tire to be restrained. As persons of ordinary skill in the art will appreciate, the first and second trigger trolley positions identified in FIG. 1 are exemplary in nature. Thus, the first and/or the second trigger trolley position can be defined at other locations along the slot 18 without departing from the scope or spirit of the invention. By way of example, not limitation, the second trigger trolley position depends on the location and size of the tire to be restrained and will, therefore, differ for different vehicles. (If no tire is present, the second trigger trolley position will preferably be located at the left-most end of the slot 18 in FIG. 1.)

For the purpose of securing a tire against longitudinal movement in one direction, the wheel restraint 10 is further provided with a tire-engaging mechanism in the form of a barrier trolley 24 (see FIG. 2). The barrier trolley 24 includes a collapsible locking assembly 26 for selectively engaging the tire. Like the trigger trolley 14, the barrier trolley 24 is disposed in part beneath the base 12. The collapsible locking assembly 26 includes a barrier or locking arm 28 in the form of a plate like member and an actuating member 30. As shown in FIG. 1, the locking arm 28 is disposed above the top surface of the base 12. The actuating member 30, which is pivotally coupled to the undersurface of the locking arm 28, is partially located within the slot 18.

As also shown in FIG. 1, the barrier trolley 24 is movable between a first barrier trolley position and a second barrier trolley position. In the first barrier trolley position (shown in solid lines in FIG. 1), the collapsible locking assembly 26 is collapsed and displaced from the tire to be chocked. In the second barrier trolley position (shown in phantom lines in FIG. 1) the locking assembly 26 is erected and the distal position of the locking arm 28 engages the tire to be restrained. As will be appreciated by persons of ordinary skill in the art, the first and second barrier trolley positions identified above are exemplary in nature. Thus, the first and/or second barrier trolley positions can be defined at other locations along the slot 18 without departing from the scope or the spirit of the invention. By way of example, not limitation, the location of the second barrier trolley position is dependent upon the location and size of the tire to be restrained. Therefore, the actual location of the second barrier trolley position will differ for vehicles of different tire size or tire location. Additionally, if no tire is present, the second barrier trolley position will preferably be located adjacent the left-most end of the slot 18 in FIG. 1.

In order to ensure the locking assembly 26 does not interfere with a vehicle backing into the parking area (or leaving the area when restraining is no longer desired), the collapsible locking assembly 26 is preferably in its collapsed state when the barrier trolley 24 is located in the first barrier trolley position. As shown in FIG. 1, when the locking assembly 26 is collapsed, the locking arm 28 is preferably disposed in a plane substantially parallel to the top surface of the base 12 to present a low profile to a backing (or exiting) vehicle. On the other hand, when the barrier trolley 24 is in the second barrier trolley position, the locking assembly 26 is erected such that the locking arm 28 is disposed at an acute angle (facing toward the dock face) to the top surface of the base 12. Prior to erecting the locking assembly 26 and restraining the tire, the locking assembly 26 travels longitudinally along the slot 18 in the collapsed position. Thus, the locking assembly 26 preferably runs low and chocks high, i.e., it only raises into an erected condition when it is adjacent the tire, as determined by engagement between that tire and the trigger.

As explained in detail below, the trigger trolley 14 and the barrier trolley 24 preferably cooperate to erect the locking assembly 26 adjacent the tire such that the distal portion of the locking arm 28 engages the tire. As also explained below, the distance between the distal portion of the locking arm 28 and the trigger 16 when the trigger trolley 14 is in the second trigger trolley position and the barrier trolley 24 is in the second barrier trolley position is dependent upon the size of the tire being chocked. This variable distance is advantageous because it ensures the distal portion of the locking arm 28 will contact the tire when the barrier trolley 24 is in its second barrier trolley position regardless of the size of the tire thereby eliminating the running start problem associated with some prior art chocks discussed above.

Figure 4A:
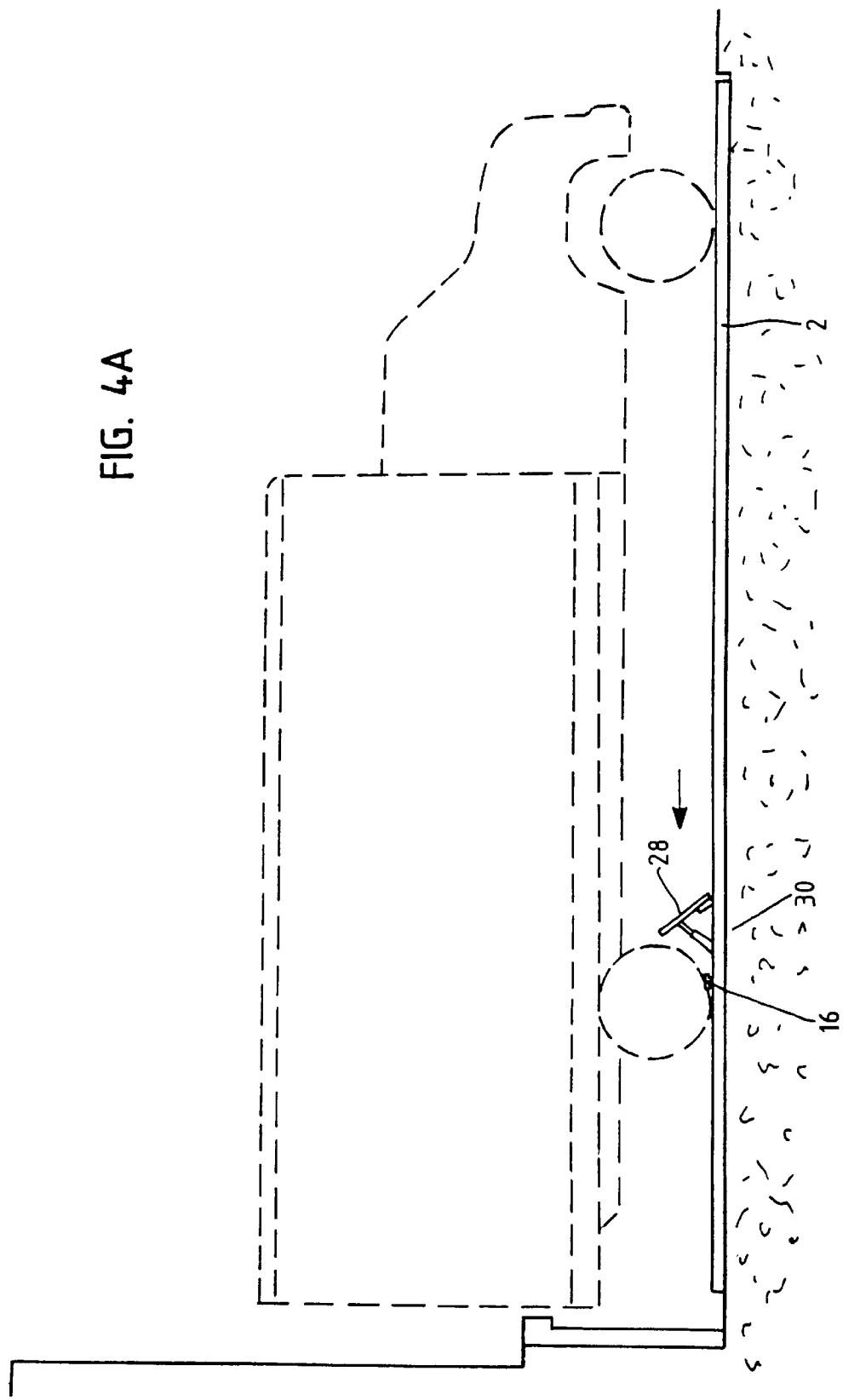
FIG. 4A is a side view of the wheel restraint of FIG. 1 in an erect position and not engaging the tire of a vehicle.

In operation, the trigger trolley 14 and the barrier trolley 24 are initially located in the first trigger trolley position and the first barrier trolley position, respectively. A vehicle is then backed into the parking area so that one set of tires is longitudinally aligned with the slot 18. Since the locking assembly 26 is in its collapsed position, the vehicle can drive over the locking assembly 26 during the parking operation, if necessary (see FIG. 3). Once the vehicle is parked, a user activates the wheel restraint 10 via a controller 34 (see FIG. 1). The controller 34 controls a hydraulic pump 32 which supplies hydraulic power to a drive mechanism associated with the vehicle restraint 10. The drive mechanism, as discussed in detail below, may be in the form of a chain drive apparatus which moves the barrier trolley 24, for example, along a longitudinal path as defined by the slot 18 in response to power supplied by the pump 32. When the barrier trolley 24 moves from the first barrier trolley position toward the second barrier trolley position engaging the tire, the barrier trolley 24 comes into contact with the trigger trolley 14. Thereafter, the drive mechanism's movement of the barrier trolley 24 also moves the trigger trolley 14 from the first trigger trolley position to the second trigger trolley position sensing a tire. The trolleys 14, 24 of the wheel restraint 10, will move longitudinally along slot 18 with the locking assembly 26 in the collapsed state. The trolleys 14, 24 continue this longitudinal movement until the trigger 14 senses a tire. This sensing preferably occurs through contact between the trigger 16 and the tire. However, persons of ordinary skill in the art will readily appreciate that other tire sensing approaches, including those employing electronic sensors, maybe employed in this role without departing from the scope or spirit of the invention. The longitudinal movement of the trigger trolley 14 stops when the tire is located. The longitudinal movement of the barrier trolley 24 continues, however, such that the barrier trolley 24 moves relative to the trigger trolley 14. A cam formed at the point(s) of contact between the trolleys 14, 24 translates this relative movement into a force which erects the locking assembly 26 (see FIG. 4 showing the locking assembly 26 in a partially erect position). The longitudinal movement of the barrier trolley with the locking assembly 26 in the fully erect position (see FIG. 4A) continues such that the locking arm 28 moves longitudinally with respect to the trigger 16 until the locking arm 28 engages the tire (see FIG. 5). If the locking assembly 26 is still not fully erected, it will become so immediately after contacting the tire. In any event, when the locking assembly 26 is erected and in engagement with the tire, the tire is secured against movement in one longitudinal direction.

The controller 34 is shown generally in FIG. 1. The controller 34 is preferably of a conventional design with pushbutton controls whose actuation controls the operation of a drive mechanism for the wheel restraint 10. The controller 34 is provided with a power button 36 for initiating the supply of power to the drive mechanism via pump 32. A stop button 38 is also provided for stopping the wheel restraint 1 during emergency situations or, if desired, after a tire has been sensed and chocked. The controller 34 also comprises a lock button 40 for actuating the wheel restraint 10 to locate and restrain a vehicle's tire. Along with the lock button 40, an unlock button 42 is also provided for returning the wheel restraint 10 to its disengaged, rest position (see FIG. 3). Auxiliary buttons 44 are also provided for user defined functions, such as the raising and lowering of a truck leveler. The controller 34 is also shown with a red indicator 46 and a green indicator 48 which can, for example, both be responsive to a sensor (not shown) on the barrier trolley 24 that indicates if the barrier is raised or preferably whether the tire is engaged or not. As will be appreciated by persons of ordinary skill in the art, the controller 34 can also control numerous other signaling applications including indicators for loading personnel inside of a dock that are red when the barrier trolley 24 is in the collapsed position and turn green when the barrier trolley 24 is raised (or, preferably, engaging the tire), as well as indicators for truck drivers outside of a dock that are red when the barrier trolley 24 is raised (or, preferably, engaging a tire) and turn green when the barrier trolley 24 is in the collapsed position. These signaling applications are within the scope and spirit of the invention.

Figure 6:
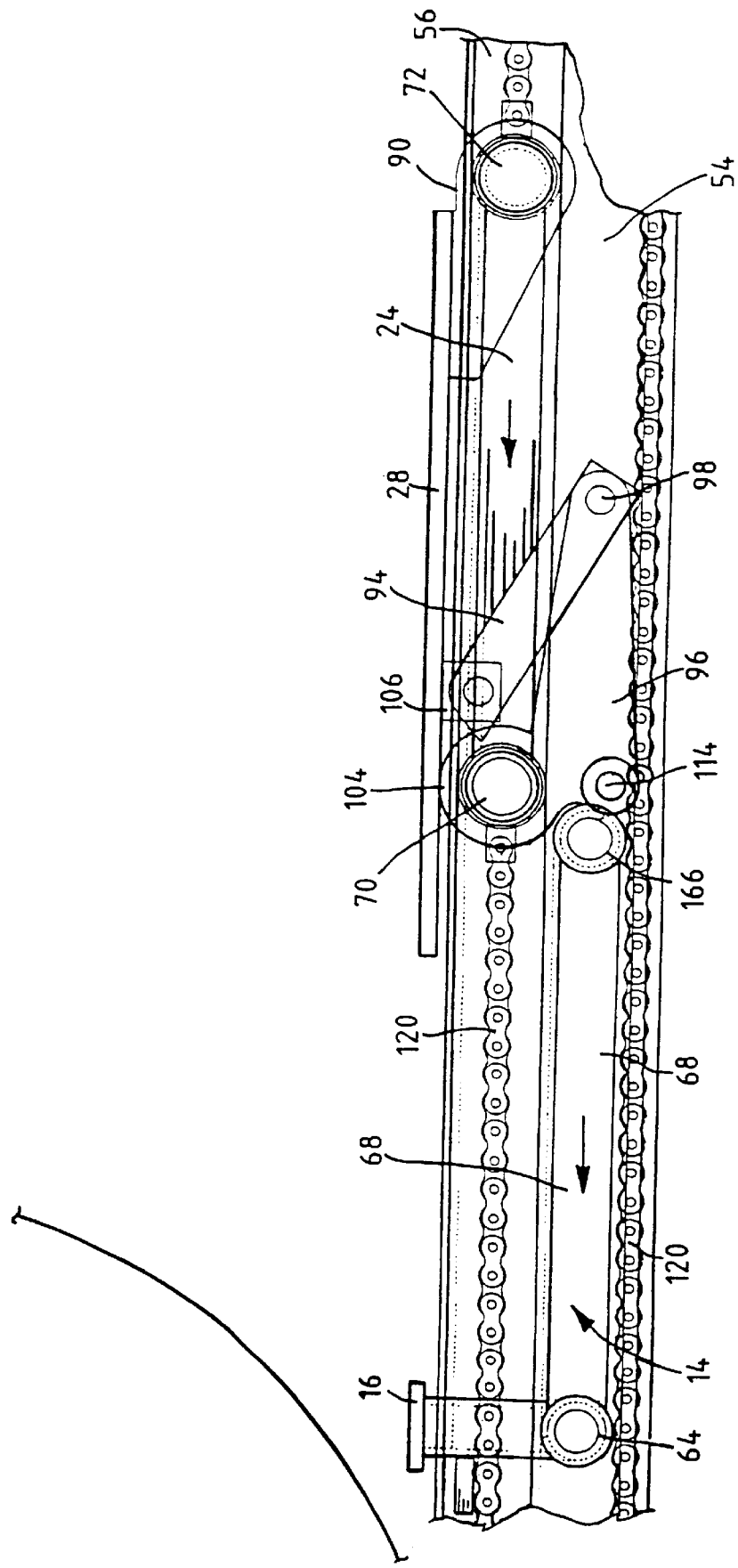
FIG. 6 is a side view of the wheel restraint in a collapsed position depicting the trigger trolley and the barrier trolley in their respective channels.

For the purpose of defining the motion paths of the trigger trolley 14 and the barrier trolley 24, the wheel restraint 10 is further provided with a trigger channel 54 and a locking assembly or barrier channel 56 as shown in FIG. 6. The trigger channel 54 is disposed in a first plane. The barrier channel 56 is disposed in a second plane which is substantially parallel to the first plane. As shown in FIG. 6, the channels 54, 56 are preferably stacked in the sense that they are immediately adjacent one another. As most easily seen in FIG. 7, the trigger channel 54 and the barrier channel 56 are preferably implemented by two opposed, carrier beams 58, 60 mounted under the top surface of the base 12. Although other materials can be used in this role, the carrier beams 58, 60 are preferably implemented by steel channels. Although in the preferred embodiment, each of the carrier beams 58, 60 is implemented by a single structure, persons of ordinary skill in the art will readily appreciate that each carrier beam could be implemented by stacked C-channels without departing from the scope or spirit of the invention.

To facilitate movement of the trigger trolley 14 within the trigger channel 54, the trigger trolley 14 is provided with a pair of front rollers 64 and a pair of back rollers 66 (see FIG. 2). The rollers 64, 66 and the carrier beams 58, 60 are sized to facilitate smooth movement of the trigger trolley 14 along the trigger channel 54. As shown in FIG. 2, the rollers 64, 66 are mounted for free rotation to an elongated base 68.

To facilitate movement of the barrier trolley 24 within the barrier channel 56, the barrier trolley 24 is provided with a pair of front rollers 70 and a pair of rear rollers 72. The rollers 70, 72 of the barrier trolley 24 and the carrier beams 58, 60 are sized to facilitate smooth movement along the barrier channel 56. As shown in FIG. 2, the rollers 70, 72 are mounted for free rotation on an elongated base 74. To accommodate the actuating member 30 when the locking assembly 26 is collapsed, the base 74 of the barrier trolley 24 preferably comprises two side beams 78 defining an elongated opening 80. The side beams are rigidly coupled via C-channels 82 at their opposite ends. As shown in FIG. 2, the opposite ends of the side beams 78 define cylindrical ports through which rigid cylindrical bars 84, 86 defining the axis of rotation of the rollers 70, 72 pass. The rigid bars 84, 86 are secured against rotation by each of the side beams 78.

For the purpose of pivotally coupling the locking arm 28 to the barrier trolley 24, the barrier trolley 24 is further provided with two rigid plate supports 90. As shown in FIG. 2, the plate supports 90 are wedge-shaped plates which are journalled on the bar 86 for pivoting movement thereabout. The plate supports 90 are welded to the undersurface of the locking arm 28. Preferably, the shapes of the plate supports 90 are selected such that the locking arm 28 lies flat, (i.e., substantially parallel to the upper surface of the base 12), when the locking assembly 26 is in the collapsed position (see FIG. 6) and such that the locking arm 28 is positioned at approximately a 45° angle with respect to the surface of the base 12 when the locking assembly 26 is in the erected position (see FIGS. 9 and 10).

Although persons of ordinary skill in the art will readily appreciate that the locking arm 28 may be implemented in many shapes and sizes without departing from the scope or spirit of the invention, in the disclosed apparatus the locking arm 28 is rectangular and is of sufficient length to ensure the distal portion of the plate 28 contacts the tallest tire to be restrained above the center line of the tire. In the presently preferred embodiment, the locking assembly 26 is approximately 34 inches long so that, when fully erected it can lock tires between sizes 30" and 42".

As mentioned above, in order to move the locking arm 28 from the collapsed position to the erected position and vice versa, the barrier trolley 24 is provided with the actuating member 30. As illustrated in FIG. 2, in the disclosed embodiment the actuating member 30 is implemented by an upper arm 94 and a lower arm 96 which are pivotally joined by a bolt 98. The upper arm 94 preferably comprises a single plate. The lower arm 96, on the other hand, is preferably implemented by two identical plates 100, 102 disposed on opposite sides of the upper arm 94 for enhanced rigidity. Preferably, the lower plates 100, 102 are separated by a distance sufficient to receive the upper arm 94 without interference when the actuating member 30 is collapsed.

The lower arm 96 of the actuating member 30 defines a foot 104 as most easily seen in FIGS. 6 and 8–10. The foot 104 extends outwardly from the lower arm 96 and is journalled for rotation about the bar 84 associated with the front rollers 70 of the barrier trolley 24.

Figure 7:
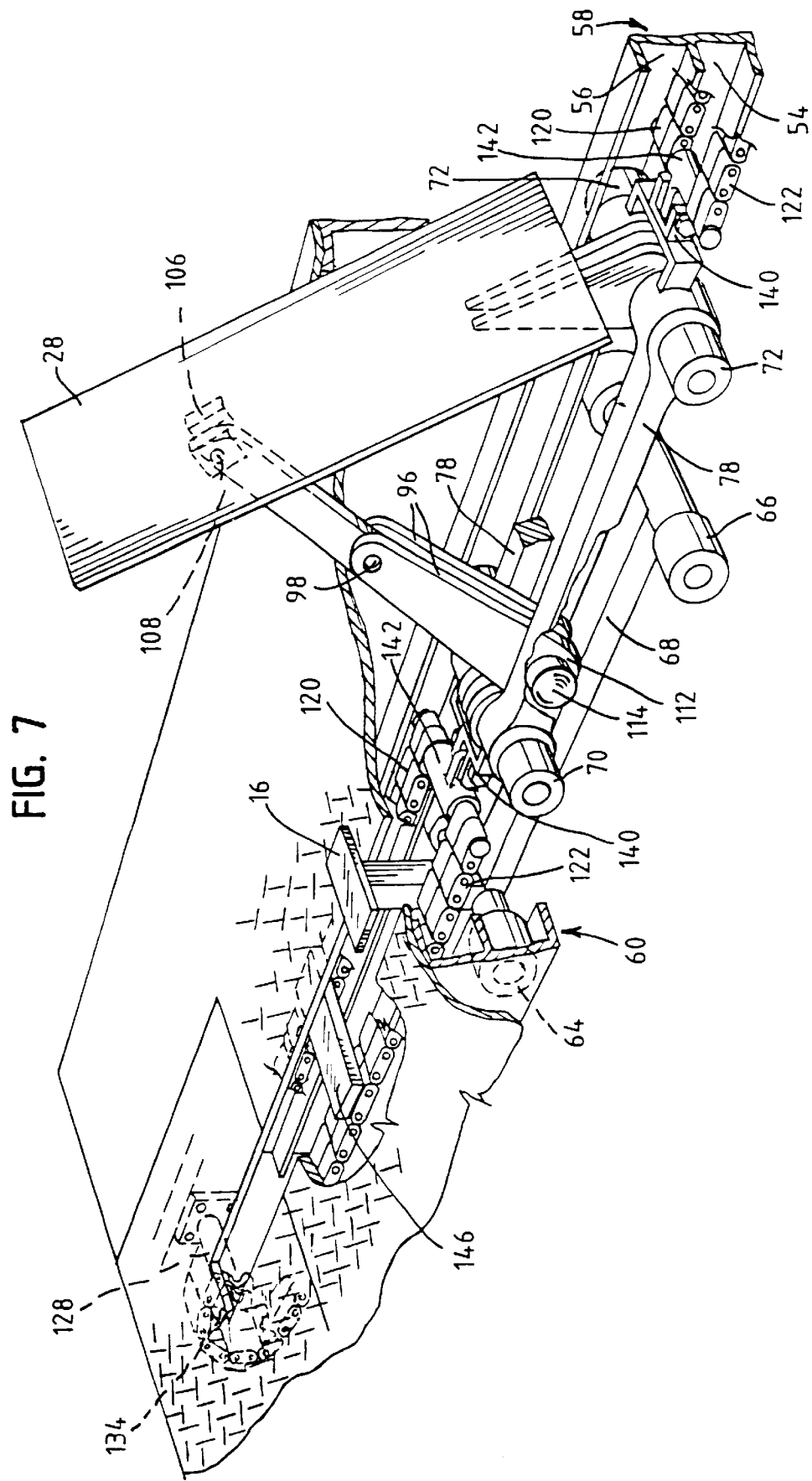
FIG. 7 is a perspective view of the wheel restraint of FIG. 1 with the base cutaway to depict the cooperation of the trigger trolley and the barrier trolley when disposed within the bottom channel and the upper channel, respectively.
Figure 8:
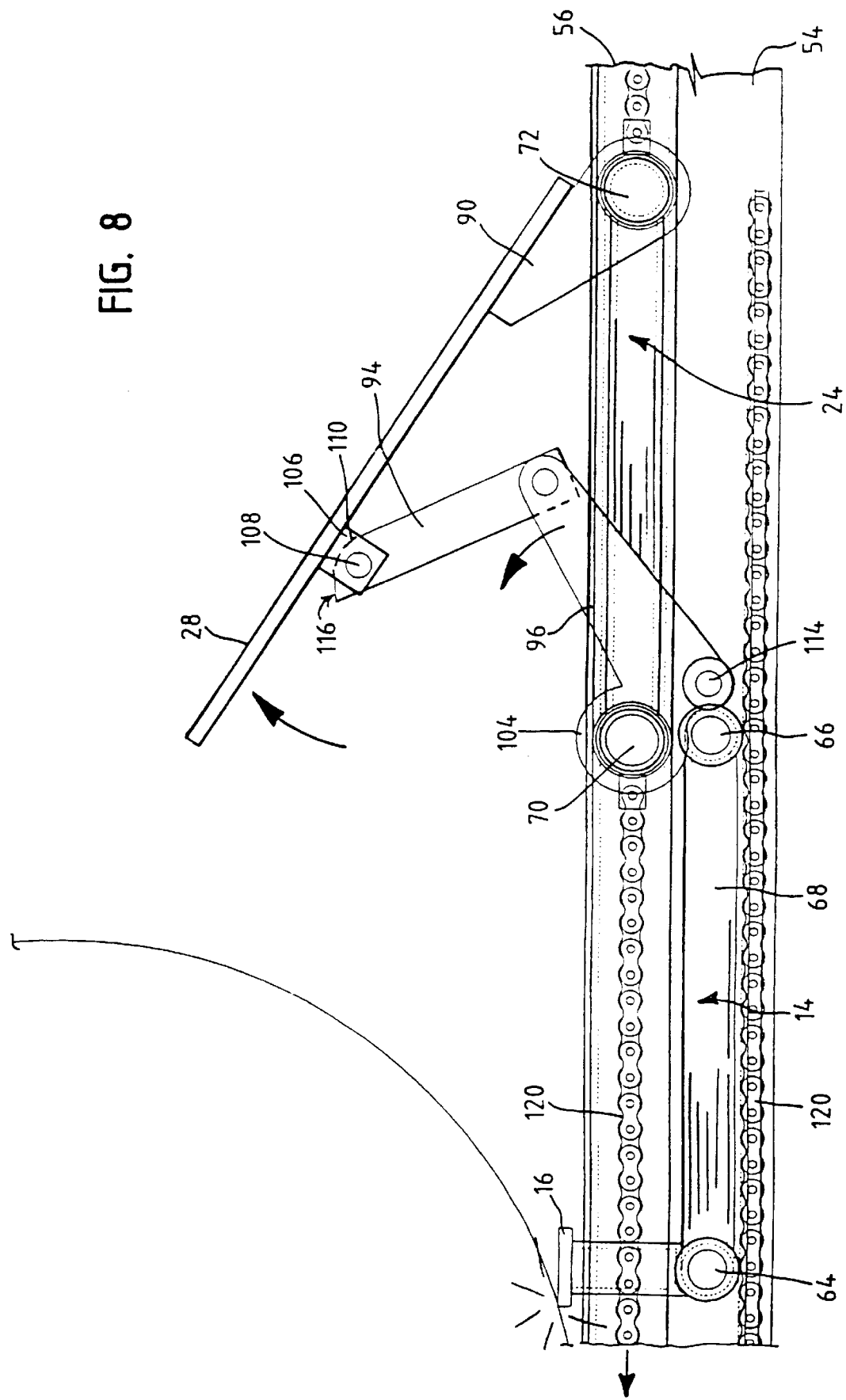
FIG. 8 is a view similar to FIG. 6 but illustrating the trigger engaging the tire and the collapsible locking assembly in the partially erect position.
Figure 9:
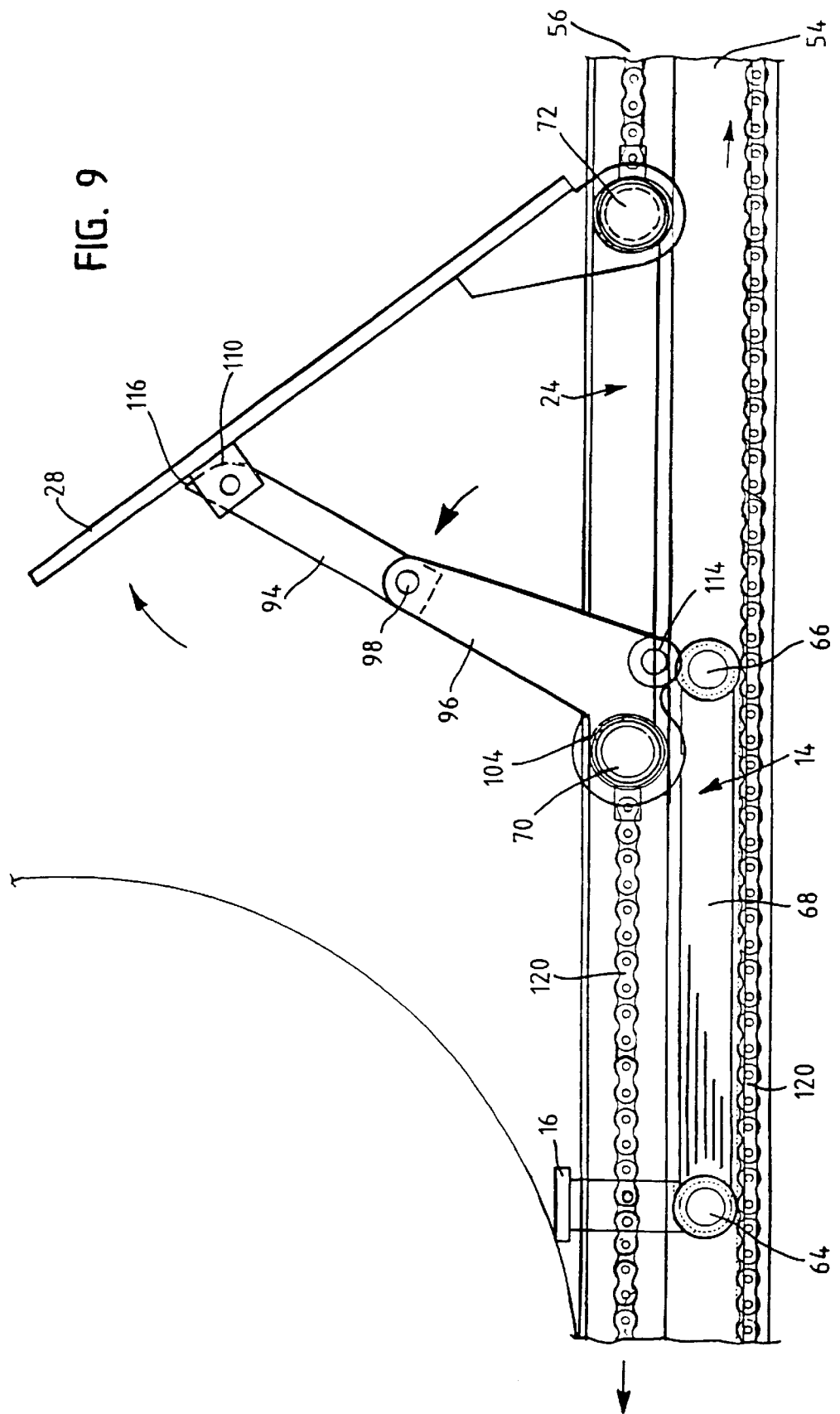
FIG. 9 is a view similar to FIG. 8 but illustrating the collapsible locking assembly in the fully erect position.
Figure 10:
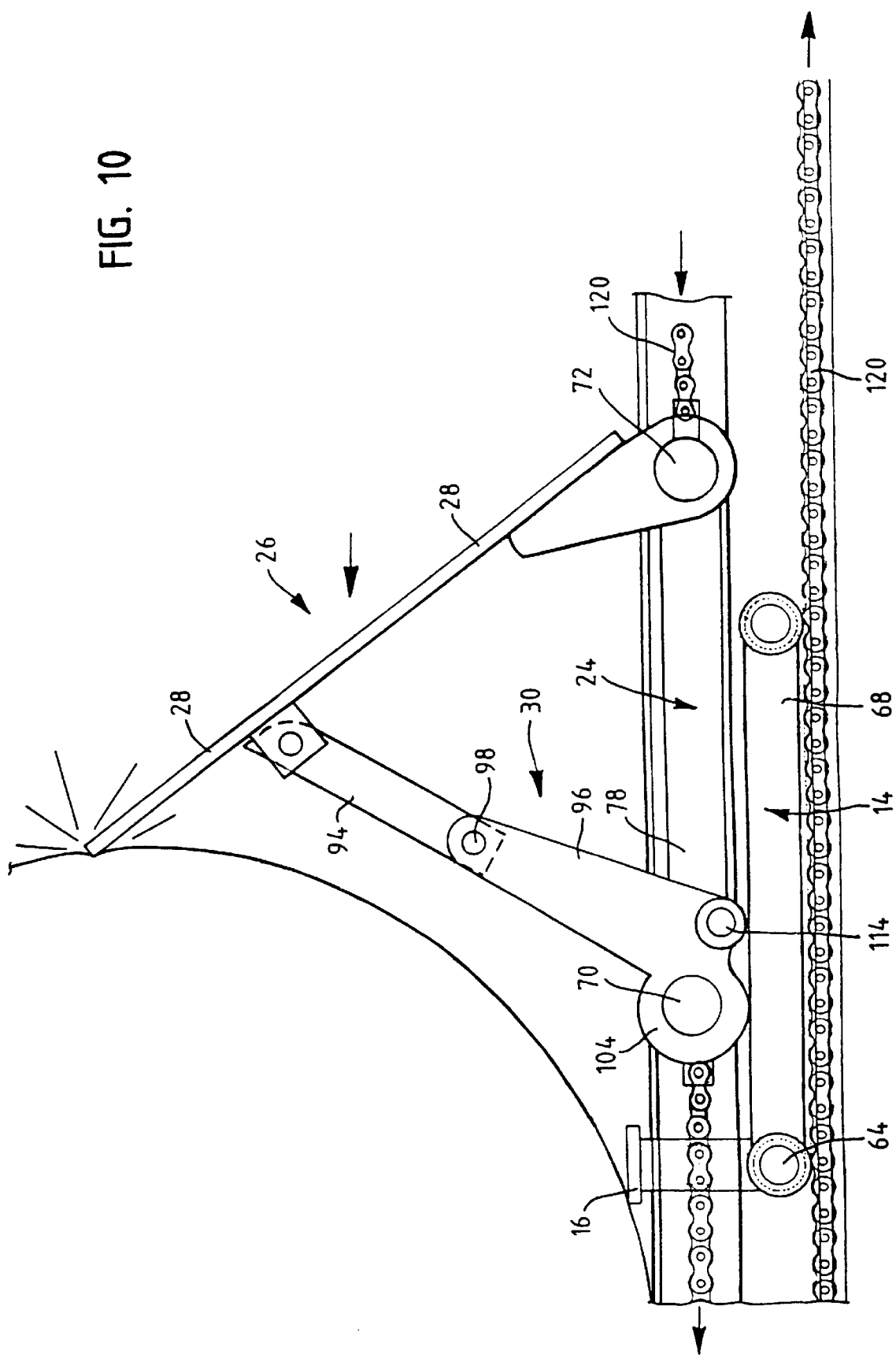
FIG. 10 is a view similar to FIG. 9 but illustrating the collapsible locking assembly engaging a tire.
Figure 11:
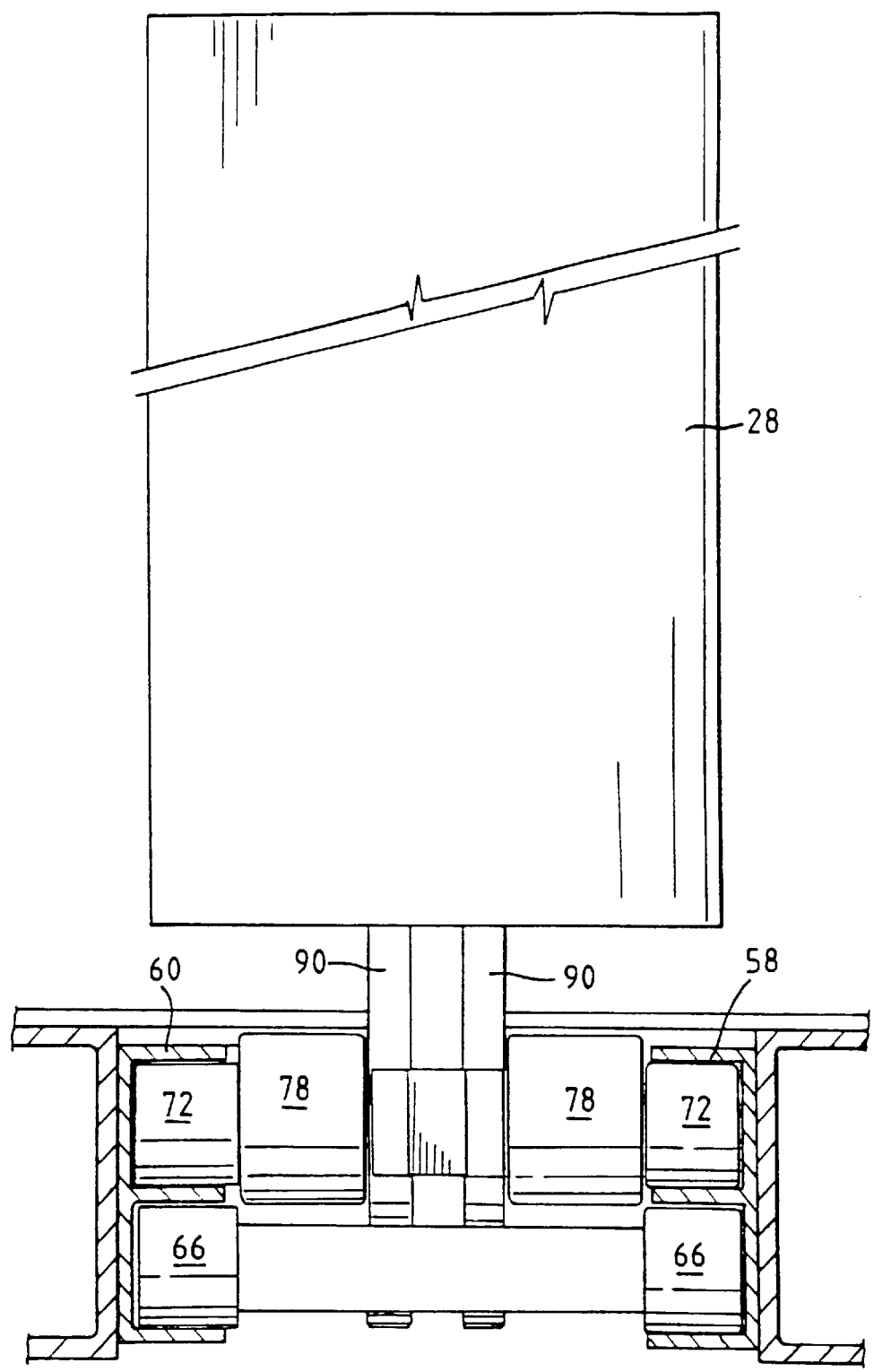
FIG. 11 is a rear plan view of the apparatus of FIG. 1 showing the locking assembly in the erected position.

To pivotally couple the actuating member 30 to the locking arm 28, the wheel restraint 10 is further provided with a clevis 106, with a clearance end 110 that allows clearance as the actuating member 30 erects the locking arm 28, and a restraining end 116 that is adjacent to the locking arm 28 when the locking arm 28 is fully erect (FIGS. 9–10). As shown in FIGS. 2 and 7, the clevis 106 is welded or otherwise secured to the undersurface of the locking arm 28. The upper end of the upper arm 94 of the actuating member 30 is pivotally disposed between the arms of the clevis 106, such that when the locking arm 28 is fully erect the upper arm 94 and the lower arm 96 are aligned and maintain this aligned condition while the tire is restrained. A clevis pin 108 such as a bolt pivotally joins the clevis 106 and upper arm 94. While the preferred embodiment of the actuating member 30 is depicted in FIG. 2, other embodiments within the scope and spirit of the invention may be implemented, including a single rod with a distal end moving along a slot in the locking arm 28.

For the purpose of moving the actuating member 30 and, thus, the locking arm 28 between collapsed and erected positions, the lower end of the lower arm 96 defines a cam surface 112 (see FIG. 2) that cooperates with a surface on the trigger trolley 14. The lower plates 100, 102 defining the lower arm 96 are joined adjacent this cam surface 112 by a motion limiting rod 114. As most easily seen in FIGS. 2 and 7, the motion limiting rod 114 extends from opposite sides of the lower arm 96 beneath the side beam 78 of the barrier trolley 24. As shown in FIG. 10, the side beams 78, the lower arm 96, the upper arm 94 and the motion limiting rod 114 are dimensioned such that the actuating member 30 enters an aligned position when the locking assembly 26 is fully erected. This aligned arrangement provides enhance rigidity and protects against premature collapse of the locking assembly 26.

As shown in FIGS. 6–10, the cam surface 112 of the actuating member 30 is positioned to selectively cooperate with the elongated base 68 of the trigger trolley 14 to erect the locking assembly 26 adjacent the tire of the vehicle to be secured against movement. More specifically, although the barrier trolley 24 is positioned for longitudinal movement within the barrier channel 56 and the trigger trolley 14 is positioned for longitudinal movement within the trigger channel 54 beneath the barrier channel 56 (see FIG. 6), when the locking assembly 26 is in the collapsed position, most of the lower arm 96 including the cam surface 112 is disposed within the trigger channel 54. As a result, when the trigger 16 locates a tire so that the trigger trolley 14 stops moving, continued forward longitudinal movement of the barrier trolley 24 results in a camming action between the cam surface 112 and the base 68 of the trigger trolley 14 (see FIG. 6). Specifically, if the barrier trolley 24 continues to move forward, the cam surface 112 must ride up onto the base 68 of the trigger trolley 14 (see FIG. 8) such that the arm 96 pivots about the rod 84. This counterclockwise pivoting movement will continue until the lower arm 96 and the upper arm 94 are aligned with the restraining end 116 of the upper arm 94 adjacent to the locking arm 28, or until the forward movement of the barrier trolley 24 relative to the trigger trolley 14 terminates, whichever event occurs first. As shown in FIG. 10, when the locking assembly 26 is fully erected, the motion limiting rod 114 is effectively captured between the undersurface of the side beam 78 and the elongated base 68 of the trigger trolley 14 such that further pivoting of the lower arm 96 in both the clockwise and counterclockwise directions is substantially precluded.

To facilitate the camming action between the base 68 of the trigger trolley 14 and the cam surface 112 of the actuating member 30, the proximal end of the base 68 is preferably curved. Preferably, the length of the base 68 is selected to permit a wide range of relative movement between the erected locking assembly 26 and the trigger 16 to thereby enable the locking assembly 26 to size and abut against a similarly wide range of tires of different sizes. For example, in the preferred embodiment, the base 68 is approximately 28 inches long, and the locking assembly 26 will contact tires ranging between 30" and 42" inches in diameter. Of course, persons of ordinary skill in the art will readily appreciate that other lengths can be selected for the base 68 and/or the vehicle restraint 10 can be adapted to restrain other ranges of tire sizes without departing from the scope or spirit of the invention.

Figure 12:
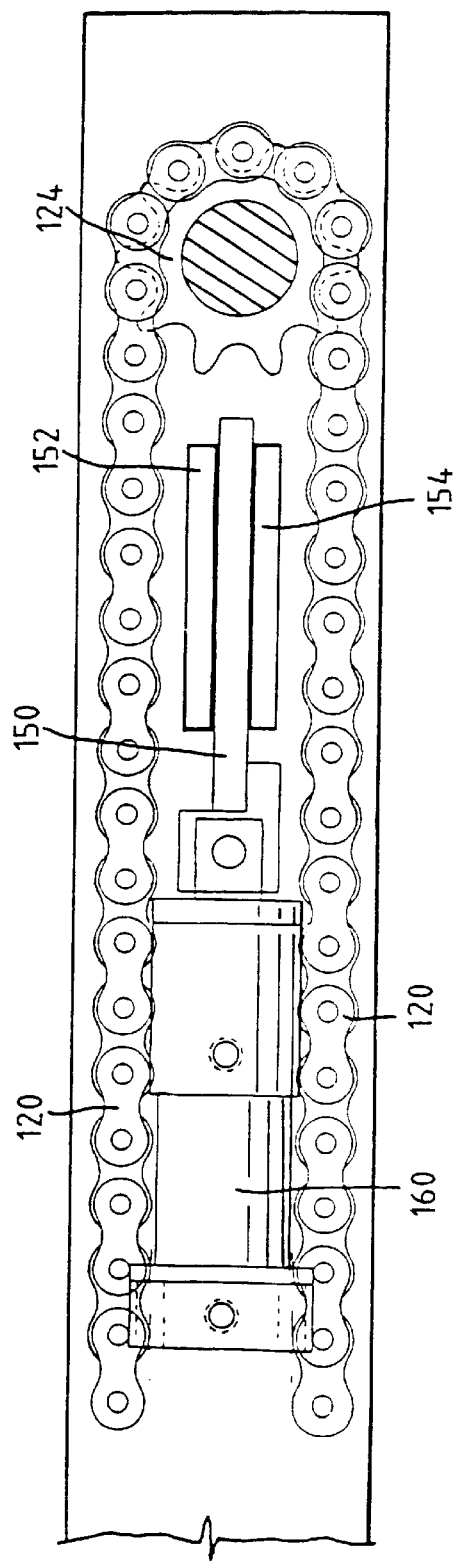
FIG. 12 is a side, cut away view of the sprocket locking mechanism of the drive mechanism of the tire locating wheel restraint of FIG. 1.
Figure 13:
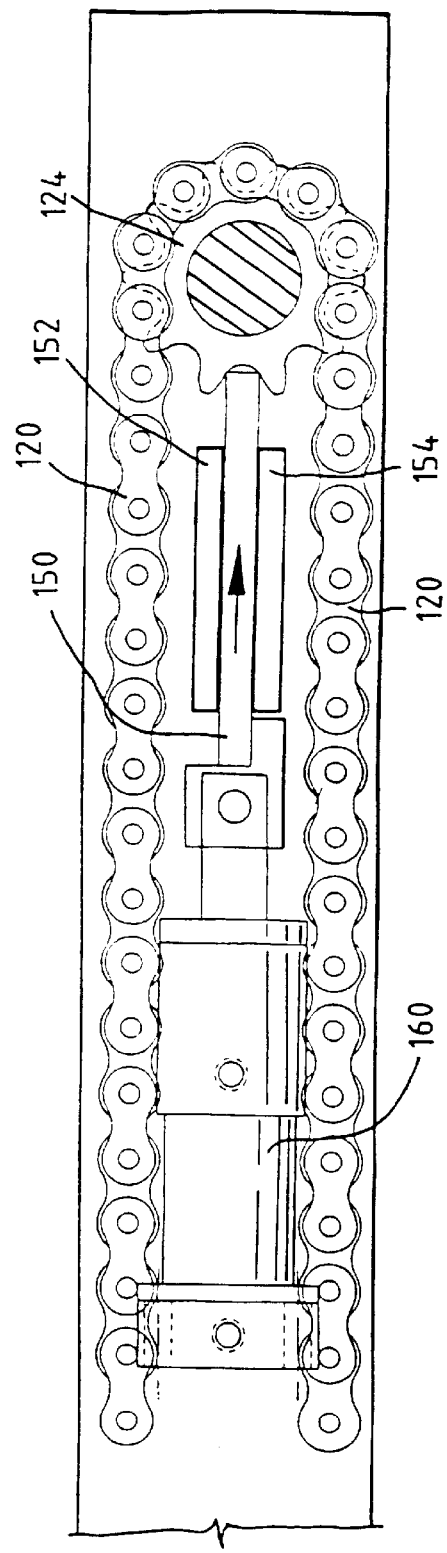
FIG. 13 is a view similar to FIG. 12 but illustrating the locking mechanism in the engaged position.
Figure 14:
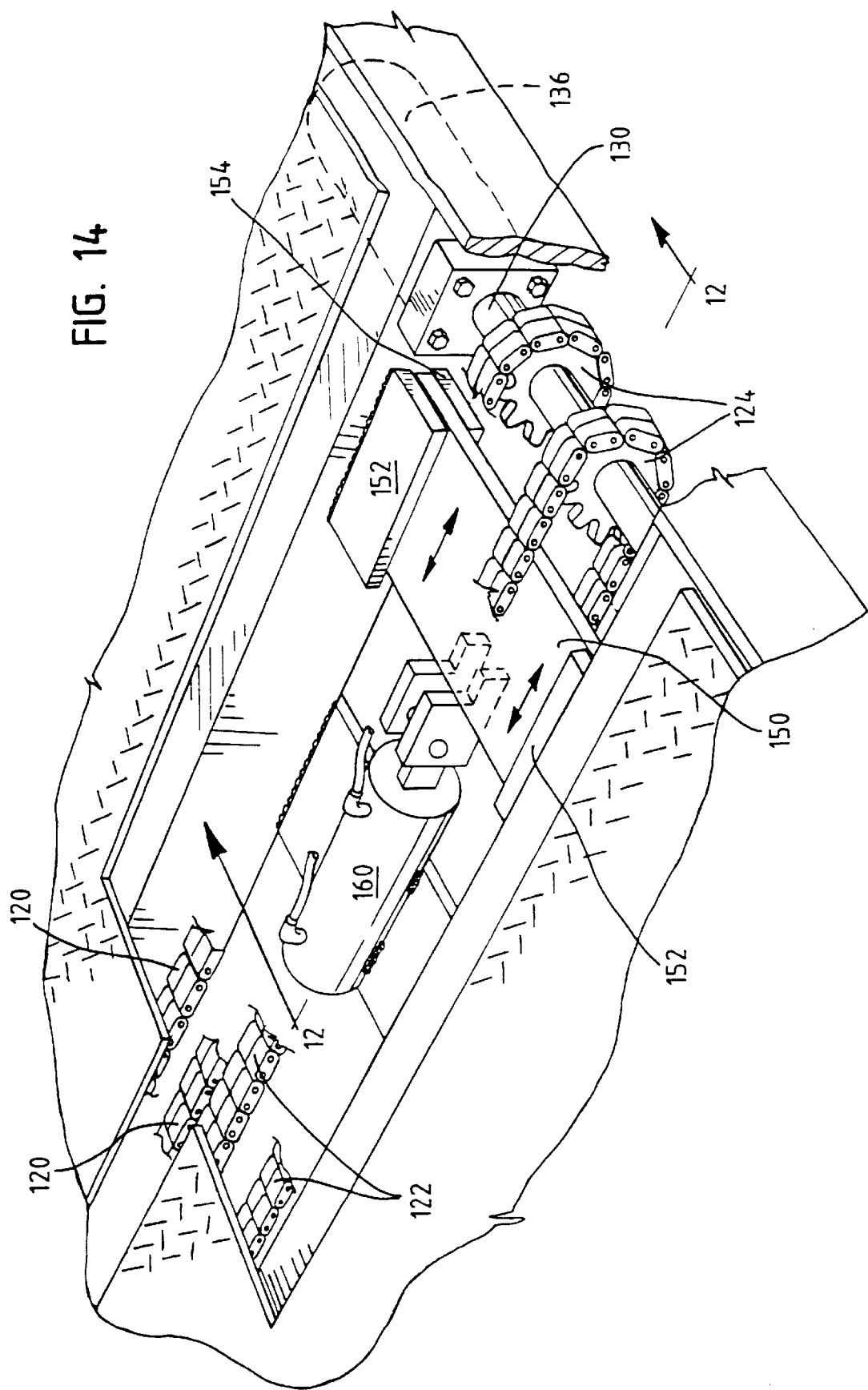
FIG. 14 is a cut away, perspective view of the locking mechanism of FIG. 12.

For the purpose of longitudinally reciprocating the trigger trolley 14 and the barrier trolley 24 along their respective channels 54, 56, the wheel restraint 10 is further provided with a drive mechanism. In the preferred embodiment, the drive mechanism is implemented as a chain drive system which employs two chains 120, 122 of substantially identical length coupled in parallel endless loop configurations. Each of the chains 120, 122 is supported by two sprockets 124, one at each bend of the endless loops (see FIGS. 12–14 (for simplicity only one bend of the loops and, thus, one pair of sprockets 124 are shown)). As illustrated in FIG. 14, the two sprockets 124 at each end of the loops are rigidly mounted on a single shaft 128, 130. Shaft 130 is coupled to a hydraulically powered drive motor 136 (see FIG. 14). The drive motor 136 receives hydraulic power from the pump 32 (FIG. 1) which is controlled, at least in part, by controller 34. A shared drive fly wheel 134 at the bends of the loops at the other end of the channels (see FIG. 7) operates in unison (i.e., at the same speed and frequency) with the motor driven shaft 130 to ensure that the chains 120, 122 are operated in synchronicity.

In order to couple the barrier trolley 24 to the drive system, the barrier trolley 24 is provided with chain couplers 140. As shown in FIG. 2, the chain couplers 140 of the illustrated barrier trolley 24 are each implemented as a clevis mounted on the C-channels 82 discussed above. As most easily seen in FIG. 7, each clevis 140 is coupled to a T-shaped connector 142. Each connector 142 is coupled to an end of each of the chains 120, 122. Each connector 142 is coupled to its respective clevis 140 with a pin such as a bolt.

Although the barrier trolley 24 is directly coupled to both chains 120, 122, the trigger trolley 14 is not directly coupled to either chain 120, 122. Instead, as most easily seen in FIG. 6, when the chains 120, 122 are rotated by the motors 134, 136 such that the barrier trolley 24 moves forward, the lower arm 96 of the collapsed actuating member 30 of the barrier trolley 24 pushes the trigger trolley 14 forward. This forward motion of the trigger trolley 14 continues until the trigger 16 of the trigger trolley 14 locates the tire to be restrained (see FIG. 8). When the tire is located, the trigger trolley 14 cannot move further forward, the barrier trolley 24 continues to move forward relative to the trigger trolley 14 under the influence of the drive system, and, therefore, the cam surface 112 of the actuating member 30 begins to ride up onto the top of the base 68 of the trigger trolley 14 (see FIGS. 8 and 9). As explained above, movement of the cam surface 112 onto the base 68 erects the actuating member 30 and, thus, the collapsible locking assembly 26. As shown in FIG. 9, the locking assembly 26 will typically be erected before the locking arm 28 contacts the tire. Relative movement between the barrier trolley 24 and the trigger trolley 14 will continue until the locking arm 28 engages the tire (see FIG. 10). When such contact occurs, the load on the motor 136 will sharply increase. A detector (not shown) is arranged to stop the motor 136 upon detection of such a load increase in a conventional manner.

When the user decides to release the vehicle, the motor 136 is reversed such that the chains 120, 122 rotate in the direction opposite that shown in FIGS. 6–10. Because the barrier trolley 24 is connected to the chains 120, 122, the barrier trolley 24 retreats from the second barrier trolley position to the first barrier trolley position, collapsing the locking assembly 26 as the cam surface 112 moves off of the trigger trolley 14. In order to move the trigger trolley 14 from the second trigger trolley position to the first trigger trolley position, the drive system is provided with a chain carrier 146. As shown in FIG. 7, the chain carrier 146 is implemented by a rigid bar mounted at each end to one of the chains 120, 122. Therefore, when the chains 120, 122 are rotated to withdraw the locking assembly 26 to its collapsed position, the carrier 146 will eventually contact the trigger 16 and force the trigger trolley from the second trigger trolley position to the first trigger trolley position. Preferably, the chain carrier 146 is positioned on the chains such that the barrier trolley 24 separates from the trigger trolley 14 before the carrier 146 contacts the trigger 16 to ensure that the locking assembly 26 fully collapses (i.e., that the cam surface 112 moves off of the base 68).

Although the illustrated wheel restraint 10 employs two drive chains 120, 122 to provide smooth movement of the trolleys 14, 24, persons of ordinary skill in the art will readily appreciate that any other number of chains (including 1 chain) could be used in this role without departing from the scope or spirit of the invention. Similarly, although the disclosed drive mechanism employs a single motor 136, persons of ordinary skill in the art will readily appreciate that any other number of motors (including two motors, such as one driving the flywheel sprocket 134) could be used in this role without departing from the scope or spirit of the invention. Furthermore, other linear drive mechanisms that do not use a chain drive fall within the scope and spirit of the present invention. For example, the barrier trolley 24 may be driven by motorized wheels in lieu of the rollers 70, 72, eliminating the need for the separate motor 136.

For the purpose of selectively locking the drive mechanism to prevent inadvertent movement of the wheel restraint 10, the wheel restraint 10 is provided with a sprocket lock mechanism. As its name implies, the sprocket lock mechanism locks the sprockets 124 against rotation which, in turn, prevents movement of the chains 120, 122 and, thus, movement of the barrier trolley 24.

To lock the sprockets 124 against movement, the sprocket lock mechanism is provided with a brake plate 150. As most easily seen in FIG. 14, the brake plate 150 comprises a rigid metal plate disposed within the endless loops formed by the chains 120, 122 in a radial plane of the sprockets 124. In the illustrated apparatus, the radial plane in which the plate 150 is positioned is substantially parallel to the channels 54, 56. The brake plate 150 is longitudinally movable within the radial plane between a locked position wherein the brake plate 150 enmeshes with the teeth of the sprockets 124 (see FIG. 13) and a released position wherein the brake plate 150 is displaced from the sprockets 124 (see FIG. 12).

In order to define the plane of movement of the brake plate 150 and to secure the brake plate against rotation and/or buckling, the lock mechanism is further provided with rigid guide plates 152. As shown in FIG. 14, the guide plates 152, 154 are preferably arranged in pairs, with one plate 152 of each pair disposed in an upper guide plane and the other plate 154 of each pair disposed in a lower guide plane. The guide plates 152, 154 are preferably separated by a distance which is only slightly larger than the thickness of the brake plate 150 to permit the brake plate 150 to slide between the guide plates 152, 154 without permitting substantial play in the sprockets 124 or pivoting of the brake plate 150 when the sprockets 124 are locked (see FIGS. 12 and 13). As illustrated in FIG. 14, the pair of guide plates 152, 154 is preferably located at each side of the brake plate 150.

To move the brake plate 150 between the locked and unlocked positions, the lock mechanism is also provided with a linear actuator 160. As shown in FIG. 14, the linear actuator 160 is rigidly secured to the brake plate 150 through welding or the like. By energizing the actuator 160 toward one direction, the brake plate 150 can be moved from the locked to the unlocked position. Energizing the actuator to move in the opposite direction will, of course, move the brake plate 150 from the unlocked position to the locked position.

While persons of ordinary skill in the art will readily appreciate that the linear actuator 160 can be manually actuated (e.g., via a push button on the controller 34) without departing from the scope or the spirit of the invention, the actuator 160 is preferably automatically actuated to move the brake plate 150 to the locked position when the locking assembly 26 has secured the tire. By way of example, not limitation, the automatic actuation can be effected whenever the motor 136 is stopped due to a sharp increase in the sensed load as explained above. Preferably, the actuator 160 is also energized to withdraw the brake plate 150 from the locked position to the unlocked position whenever the user attempts to energize the motor 136 in the direction required to collapse the locking assembly 26.

Although the tire locating wheel restraint 10 has been illustrated as operating on one tire, it will be apparent to persons of ordinary skill in the art that the wheel restraint 10 can be applied to more than one tire on the same side of the vehicle, on opposite sides of the vehicle, or both without departing from the scope or spirit of the invention.

Figure 15:
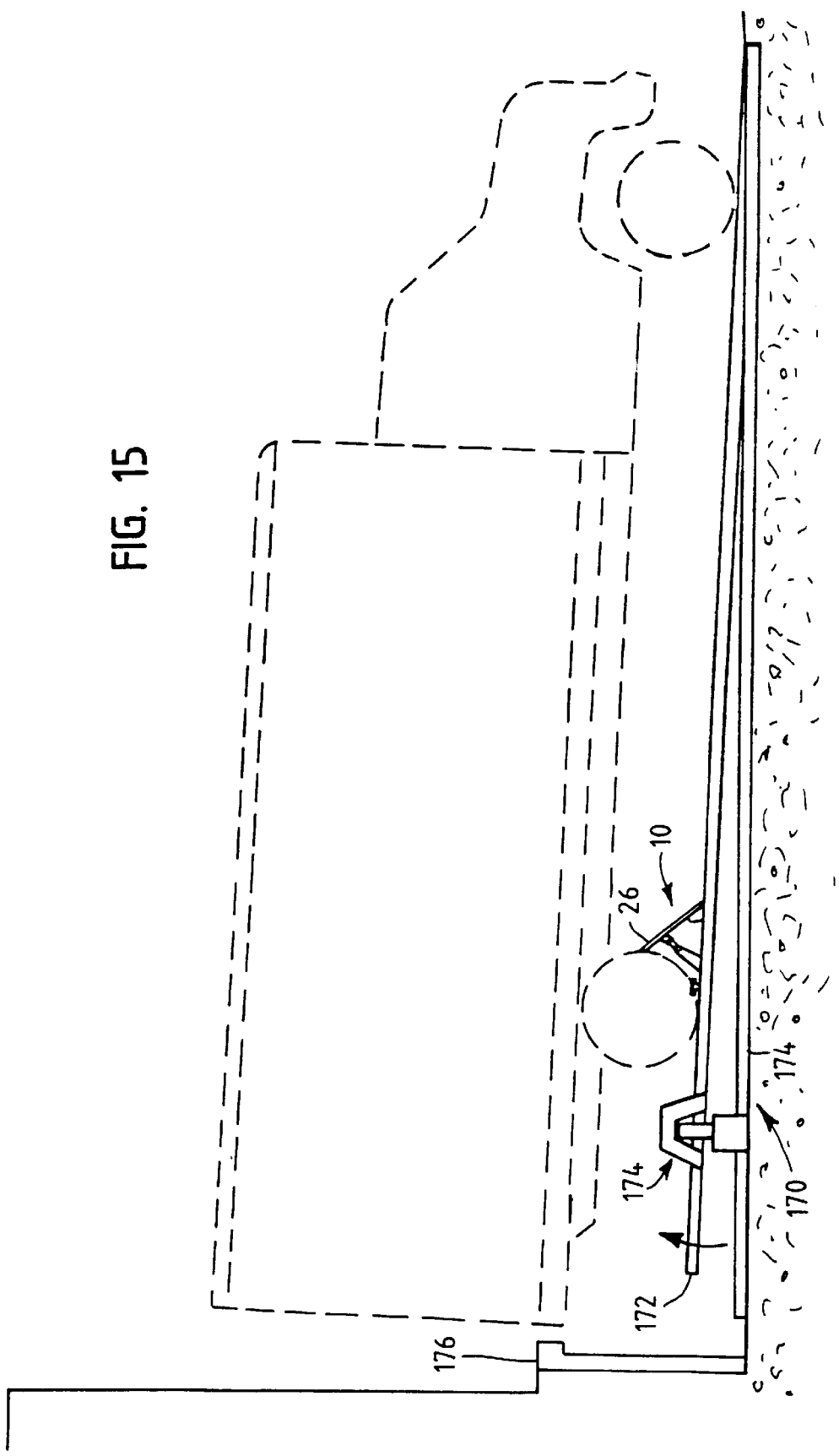
FIG. 15 is a side view of the wheel restraint of FIG. 1 employed in a truck leveler, where the truck leveler has been activated to raise the rear of the truck relative to ground.

As mentioned above, the disclosed vehicle restraint 10 may optionally be employed with a truck leveler 170. As schematically illustrated in FIG. 15, a typical truck leveler 170 includes a raisable platform 172 mounted adjacent a pit. A raising mechanism 174, which is typically hydraulically powered, is disposed within the pit. As shown in FIG. 15, the raising mechanism 174 can be actuated to raise the platform 172 with a vehicle disposed thereon. Such raising can be performed to raise the bed of the truck to within a desired vertical distance of a dock 176. The truck leveler 170 is typically powered by the pump 180 (see FIG. 1), which is also used to actuate the drive mechanism of the wheel restraint 10, and controlled by auxiliary buttons 44 on the controller 34 which will activate the supplying of hydraulic power to the raising mechanism 174. In any event, the truck leveler 170 will typically be actuated after the wheel restraint 10 has erected the locking assembly 26 adjacent a wheel as shown in FIG. 15 to ensure the vehicle does not move forward when the leveler 170 is raised.

Although for simplicity of illustration, they have not been shown in FIG. 15, the carrier beams 58, 60 of the wheel restraint 10 are disposed in the raisable platform 172 of the truck leveler 170, and the slot 18 is preferably formed in the top surface of the platform 172. Thus, the wheel restraint 10 is preferably mounted substantially within the platform 172. As will be appreciated by persons of ordinary skill in the art, the vehicle restraint 10 is, thus, adaptable for use with any number of different truck levelers 170. Indeed, pre-existing levelers 170 may optionally be retrofitted with the wheel restraint 10 by installing a slot in the platform 172.

Those of ordinary skill in the art will appreciate that, although the teachings of the invention have been illustrated in connection with certain embodiments, there is no intent to limit the invention to such embodiments. On the contrary, the intention of this patent is to cover all modifications and embodiments fairly falling within the scope of the appended claims either literally or under the doctrine of equivalents.

We claim:

1. For use in restraining a parked vehicle having a tire in a parking area, a tire locating wheel restraint comprising:

first trolley including a trigger positioned for selectively locating the tire of the vehicle, the first trolley being moveable between a first position wherein the trigger is displaced from the tire and a second stationary position wherein the trigger locates the tire; and a second trolley including a collapsible locking assembly having a distal portion for engaging the tire, the second trolley being moveable from a third position wherein the collapsible locking assembly is out of engagement with the tire to a fourth position wherein the distal portion of the collapsible locking assembly is in restraining engagement with the tire, the first trolley with the trigger in the second stationary position and the second trolley cooperating to erect the collapsible locking assembly adjacent the tire such that the distal portion of the collapsible locking assembly contacts the tire, wherein the distance between the distal portion of the collapsible locking assembly and the trigger when the second trolley is in the fourth position and the first trolley is in the second stationary position is dependent upon the size of the tire, wherein the collapsible locking assembly further comprises an actuating member for selectively erecting the locking assembly, the actuating member comprising a cam surface which operatively engages the first trolley to erect the collapsible locking assembly.

2. For use in restraining a parked vehicle having a tire in a parking area, a tire locating wheel restraint comprising:
   a first trolley including a trigger positioned for selectively locating the tire of the vehicle, the first trolley being moveable between a first position wherein the trigger is displaced from the tire and a second stationary position wherein the trigger locates the tire; and
   a second trolley including a collapsible locking assembly having a distal portion for engaging the tire, the second trolley being moveable from a third position wherein the collapsible locking assembly is out of engagement with the tire to a fourth position wherein the distal portion of the collapsible locking assembly is in restraining engagement with the tire, the first trolley with the trigger in the second stationary position and the second trolley cooperating to erect the collapsible locking assembly adjacent the tire such that the distal portion of the collapsible locking assembly contacts the tire, wherein the distance between the distal portion of the collapsible locking assembly and the trigger when the second trolley is in the fourth position and the first trolley is in the second stationary position is dependent upon the size of the tire, wherein the collapsible locking assembly further comprises an actuating member for selectively erecting the locking assembly, the actuating member erecting the locking assembly by relative movement between the first trolley and the second trolley.

3. For use in restraining a parked vehicle having a tire in a parking area, a tire locating wheel restraint comprising:
   a first trolley including a trigger positioned for selectively locating the tire of the vehicle, the first trolley being moveable between a first position wherein the trigger is displaced from the tire and a second stationary position wherein the trigger locates the tire;
   a second trolley including a collapsible locking assembly having a distal portion for engaging the tire, the second trolley being moveable from a third position wherein the collapsible locking assembly is out of engagement with the tire to a fourth position wherein the distal portion of the collapsible locking assembly is in restraining engagement with the tire, the first trolley with the trigger in the second stationary position and the second trolley cooperating to erect the collapsible locking assembly adjacent the tire such that the distal portion of the collapsible locking assembly contacts the tire, wherein the distance between the distal portion of the collapsible locking assembly and the trigger when the second trolley is in the fourth position and the first trolley is in the second stationary position is dependent upon the size of the tire; and
   a drive mechanism comprising:
      a motor;
      a first sprocket operatively coupled to the motor;
      a second sprocket; and
      an endless chain operatively engaging the first and second sprockets, the endless chain being coupled to the second trolley to selectively move the second trolley between the third and fourth positions.

4. A tire locating wheel restraint as defined in claim 3 wherein the second trolley pushes the first trolley from the first position to the second position when the motor drives the second trolley from the third position to the fourth position.

5. A tire locating wheel restraint as defined in claim 3 wherein the drive mechanism further comprises a chain carrier coupled to the chain for moving the first trolley from the second position to the first position.

6. A tire locating wheel restraint as defined in claim 3 further comprising a lock mechanism for securing at least one of the first and second sprockets against rotation.

7. For use in restraining a parked vehicle having a tire in a parking area, a tire locating wheel restraint comprising:
   a first trolley including a trigger positioned for selectively locating the tire of the vehicle, the first trolley being moveable between a first position wherein the trigger is displaced from the tire and a second stationary position wherein the trigger locates the tire; and
   a second trolley including a collapsible locking assembly having a distal portion for engaging the tire, the second trolley being moveable from a third position wherein the collapsible locking assembly is out of engagement with the tire to a fourth position wherein the distal portion of the collapsible locking assembly is in restraining engagement with the tire, the first trolley with the trigger in the second stationary position and the second trolley cooperating to erect the collapsible locking assembly adjacent the tire such that the distal portion of the collapsible locking assembly contacts the tire, wherein the distance between the distal portion of the collapsible locking assembly and the trigger when the second trolley is in the fourth position and the first trolley is in the second stationary position is dependent upon the size of the tire, wherein the first trolley is disposed in a first channel and the second trolley is disposed in a second channel, the first and second channels being substantially parallel, the second channel being disposed above the first channel.

8. For use in restraining a parked vehicle having a tire in a parking area, a tire locating wheel restraint comprising:
   a first channel located in a first plane;
   a second channel located in a second plane adjacent the first plane;
   a first trolley disposed for movement along the first channel and including a trigger positioned for locating an exposed face of the tire of the vehicle; and
   a second trolley disposed for movement along the second channel and including a collapsible locking assembly having a distal portion for engaging the tire of the vehicle on said exposed face to restrain tire movement, the collapsible locking assembly including a cam surface which cooperates with the first trolley to erect the collapsible locking assembly after the trigger has become stationary.

9. A tire locating wheel restraint as defined in claim 8 wherein the cam surface cooperates with the first trolley to erect the collapsible locking assembly by relative movement between the first trolley and the second trolley.

10. A tire locating wheel restraint as defined in claim 8 wherein the cam surface is disposed within the first plane when the collapsible locking assembly is collapsed, and the cam surface is disposed within the second plane when the collapsible locking assembly is erected.

11. A tire locating wheel restraint as defined in claim 8 wherein the collapsible locking assembly further comprises an actuating member for selectively erecting the locking assembly.

12. A tire locating wheel restraint as defined in claim 11 wherein the second trolley comprises a locking arm which cooperates with the actuating member to form the locking assembly.

13. A tire locating wheel restraint as defined in claim 8 wherein the first trolley further comprises a first front roller and a first back roller and the second trolley comprises a second front roller and a second back roller.

14. A tire locating wheel restraint as defined in claim 8 wherein the trigger by engaging the tire forms a stationary contact with the tire relative to the parking area.

15. A tire locating wheel restraint as defined in claim 8 wherein the tire wheel locating restraint is housed in a truck leveler.

16. A tire locating wheel restraint as defined in claim 8 and including a drive mechanism comprising:

a motor;

a first sprocket operatively coupled to the motor;

a second sprocket; and an endless chain operatively engaging the first and second sprockets, the endless chain being coupled to the second trolley to selectively move the second trolley between a third, non-engaging position and a fourth, engaging position.

17. A tire locating wheel restraint as defined in claim 16 wherein the second trolley pushes the first trolley from a first, non-locating position to a second, locating position when the motor drives the second trolley from the third position to the fourth position.

18. A tire locating wheel restraint as defined in claim 17 wherein the drive mechanism further comprises a chain carrier coupled to the chain for moving the first trolley from the second position to the first position.

19. A tire locating wheel restraint as defined in claim 16 further comprising a lock mechanism for securing at least one of the first and second sprockets against rotation.

\* \* \* \* \*

UNITED STATES PATENT AND TRADEMARK OFFICE
CERTIFICATE OF CORRECTION

PATENT NO.    : 6,505,713 B1                                           Page 1 of 1
DATED         : January 14, 2003
INVENTOR(S)   : Paul et al.

It is certified that error appears in the above-identified patent and that said Letters Patent is hereby corrected as shown below:

Column 12,
Line 45, please delete "first trolley" and insert -- a first trolley --.

Signed and Sealed this

Fourth Day of November, 2003

JAMES E. ROGAN
*Director of the United States Patent and Trademark Office*